United States Patent Office 2,795,563
Patented June 11, 1957

2,795,563
ODORLESS COATING COMPOSITION

Hans Low, Edwardsville, Ill., assignor to Shell Development Company, Emeryville, Calif., a corporation of Delaware No Drawing. Application June 18, 1953,
Serial No. 362,669

12 Claims. (Cl. 260—22)

This invention relates to a new coating composition which, although containing hydrocarbon thinner and being substantially devoid of water, is nevertheless free from odor. More particularly, the invention pertains to a new composition for use as an air-drying enamel containing an alkyd resin that hardens by air-drying and oxidation, carried in an isoparaffinic hydrocarbon thinner.

There has been great need for a truly odorless surface coating composition that contains an air-drying resinous vehicle and has the advantages of being devoid of water. Although so-called odorless mineral spirits and naphtha have been used in recent years as thinners in air-drying surface coating compositions, these nevertheless have appreciable odor associated therewith. There are two types of odor to be considered. One is residual odor that will remain after the hydrocarbon thinner has evaporated from the applied film of the coating composition. Such residual odor from the thinner is almost entirely due to impurities such as sulfur, nitrogen and phenolic compounds which may be removed from the mineral spirits and naphtha by full and adequate refining thereof. However, the other type, or bulk odor from the hydrocarbon vapors is caused by the hydrocarbons themselves even though the thinner is as highly refined as possible. This bulk odor is the characteristic odor of aromatic, naphthenic and normal paraffinic hydrocarbons contained in the highly refined thinner. Thus while the problem of disagreeable residual odor has been solved in recent years with so-called odorless mineral spirits and naphthas that are highly refined, the bulk odor problem has remained. In applied use, especially where the coating composition is applied as films to the surfaces of walls and the like in a confined enclosure such as the rooms of a building, there is still a great deal of bulk odor from the vapors of the thinner which evaporates from the films.

There is only one class or kind of volatile hydrocarbons in the thinner boiling range that are free of odor, like distilled water. These are the isoparaffins. Unfortunately the isoparaffins have the poorest solvency power for air-drying resinous surface coating vehicles such as alkyd resins of all the different types of hydrocarbons. In fact, alkyd resins are often precipitated or kicked out of solution before sufficient isoparaffinic hydrocarbon can be added as thinner to make a surface coating composition of practicable viscosity for brushing and the like. This result has limited the use of isoparaffins as thinner in surface coating compositions prior to the present invention.

It is therefore an object of the present invention to provide a truly odorless air-drying surface coating composition composed wholly of organic materials aside from the inorganic pigments therein—i. e., an odorless composition which is devoid of water as carrier for the resinous vehicle. A principal object of the invention is to provide a coating composition containing an air-drying resinous ester as vehicle dissolved or carried in odorless isoparaffins as thinner. A particular object is to provide a coating composition having a short to medium oil length air-drying alkyd resin in odorless isoparaffins. These and other objects which will be apparent are attained by my invention which is described and claimed hereinafter.

In brief, the invention is an odorless surface coating composition comprising an air-drying resinous ester vehicle dissolved and/or dispersed in isoparaffinic hydrocarbon thinner containing a solubilizing amount of non-ionic surface active agent such as about 0.3 to 8% by weight of glycerol monooleate. It was unexpected to discover that no adverse effect is encountered with the coating composition when pigmented in regard to drying time, resistance to penetration of a porous surface, and freedom from overlap markings in spite of the presence therein of the non-ionic surface active agent having alcoholic hydroxyl groups as the hydrophilic part of the compound. The resultant dried film also has uniform sheen, hardness and mar resistance. Furthermore, even though the non-ionic surface agent is non-volatile and therefore remains in the dried film, nevertheless the dried film has equal water resistance and water spot recovery as a corresponding film obtained by depositing and drying the same vehicle in the absence of the surface active agent.

The odorless thinner employed in the composition of the invention is a mixture of isoparaffins having highly branched structures. These isoparaffins are most readily obtained by fractionation of the alkylate produced by condensing olefins with lower boiling isoparaffins in the presence of an acid catalyst such as sulfuric acid, hydrofluoric acid or the like. Thus isobutane and/or isopentane may be alkylated with butylenes as well as propylene and amylenes whereby there is obtained both alkylate boiling in the gasoline range and higher boiling alkylate. Isoparaffins of suitable boiling range and evaporation rate are obtained from the crude alkylate by fractional distillation. While isoparaffinic alkylate having a boiling range of from about 300° F. to 470° F. may be used in the composition of the invention, a more preferred boiling range is from about 325° F. to 425° F., particularly from about 340° F. to 420° F. The methods of obtaining the crude alkylate and fractionation thereof to the desired cuts are so well known that detailed description of such operations is not necessary here.

Another source of the highly isoparaffinic thinner is the product obtained by hydrogenation of olefin polymers and copolymers. Thus highly branched chain isoparaffins are obtainable by hydrogenating to saturation olefin polymers such as triisobutylene from polymerization of isobutylene, branched chain dodecylenes from copolymerization of the various butylene isomers, trimers and tetramers from propylene polymerization, and similar mixed polymers from polymerization together of propylenes, butylenes and/or amylenes. Methods of producing such polymers and their hydrogenated products are also well known. For use as thinner in the composition of the invention, fractionated cuts of the hydrogenated polymers are employed that have like boiling ranges as was described above for the alkylate fractions.

The isoparaffins of which the odorless thinner is composed, have highly branched chain and very complex chemical structure. In general, they contain about 9 to 14 carbon atoms although isoparaffins of 11 to 13 carbon atoms are particularly preferred. Among the hydrocarbons which may be included are such compounds as 2,2,4-trimethylhexane, 2,2,5-trimethylhexane, 2,4,4-trimethylhexane, 2,2,6 - trimethylheptane, 2,3,4,4 - tetramethylpentane, 3-methyl-3-ethylhexane, 2-methyl-4-ethylhexane, 2-methyl-3-ethylhexane, 3,4,5,5-tetramethylheptane, 2,3,4,4-tetramethylheptane, 3,3,5-trimethyloctane, 3,5,5-trimethyloctane, 3,3-dimethyl-5-ethylheptane, 3,5-dimethyl-5-ethylheptane, 2,3,4 - trimethyl-4-ethylhexane, 2,2,4,6,6 - pentamethylheptane, 2,4,4,6,6-pentamethylheptane and the like.

These odorless isoparaffins contain at least two carbon atoms from the group of tertiary and quaternary carbon atoms—i. e., contain at least two carbon atoms that have no more than one hydrogen atom linked directly thereto.

The film forming constituent of the composition is a resinous carboxylic acid ester that hardens by air-drying and oxidation. Most typical of the class are drying oil modified alkyd resins. Most of these resins have at best only limited solubility or miscibility in the isoparaffinic thinner, but by incorporating a small solubilizing amount of non-ionic surface active agent in the composition according to the principle of the invention, there is obtained a homogeneous mixture that may be brushed and spread to coat surfaces. With respect to the air-drying resinous esters, it is to be here noted that the composition is not concerned with drying oils such as linseed oil which are the film forming constituents of paint. Such non-resinous drying oils are completely miscible with the odorless isoparaffins, and consequently they present no difficulty in preparing surface coating compositions. However, these drying oils (triglycerides) have characteristic bulk odor themselves as is the case with linseed oil, for example. This bulk odor of the drying oils makes the oils unsuitable for odorless surface coating compositions.

Of the various air-drying ester resins used in the composition, the well known air-drying oil modified alkyd resins are most representative. As recognized, these are obtainable by reacting drying or semi-drying oil fatty acid, a dicarboxylic acid or anhydride, and a polyhydric alcohol together whereby a resinous ester is produced which has the property of drying and hardening as a film when in contact with air—i. e., oxidative drying occurs. Among typical fatty acids used for preparation of the alkyd resin are the acids from linseed oil, soybean oil, dehydrated castor oil, tung oil, oiticica oil and perilla oil as well as fatty acid of lesser extent of unsaturation from cottonseed oil, peanut oil and olive oil. The fatty acid from such natural oil is normally not a pure chemical compound and usually consists of a combination of several acids including linoleic, linolenic, oleic, eleostearic and stearic acid. In general, the fatty acid contains 12 to 22 carbon atoms and has olefinic unsaturation so the iodine number or value thereof is at least 110. The dicarboxylic acids used in preparing the alkyd resin include phthalic, maleic, fumaric, succinic, adipic and sebacic as typical. Usually the alkyd resin is an ester of glycerol, although other suitable polyhydric alcohols include pentaerythritol, dipentaerythritol, polyglycerol, sorbitol, mannitol, trimethylol propane, methyl glucoside, polyallyl alcohol and the like.

Alkyd resins particularly suited for the invention are those derived from phthalic anhydride which are known as short to medium oil length. These include so-called short oil length resins having about 25 to 45 percent unsaturated fatty acid and about 35 to 40 percent of phthalic anhydride therein as well as medium oil length resins having about 45 to 55 percent unsaturated fatty acid and about 30 to 35 percent phthalic anhydride therein. While the polyhydric alcohol used in making the resin is usually glycerol, minor proportions of others including pentaerythritol and dipentaerythritol are advantageously used in combination therewith. Rosin and tall oil are also often included in minor amounts for preparation of the air-drying alkyd resins. As known, the proportions of acidic constituents and polyhydric alcohols used in preparing them are chosen and regulated so there is a small excess such as about 3 to 10% excess of polyhydric alcohols over the chemical equivalent of acids and anhydrides in order that the resinous product will have a low acid number and will therefore dry properly.

The alkyd resins made by any of the customary methods are suitable for the composition of the invention. Thus the resin may be prepared by the fusion method whereby a mixture of the acids and polyhydric alcohol is heated at about 375–525° F. in a reaction vessel while sparging with inert gas such as carbon dioxide to remove the water of esterification. The heating is continued until the esterification is substantially complete and the acid number is reduced to less than about 20. If desired, the resin while still molten and hot is quenched with sufficient isoparaffinic hydrocarbon thinner to give about a 40–90% solids basis solution of resin.

The solution method of manufacture may also be used wherein the mixture of reactants dissolved in a small amount (such as about 5 to 15% of hydrocarbon thinner) is heated and the formed water is removed as its azeotrope with the thinner. The refluxing hydrocarbon returns to the reaction vessel through a water separator.

Another method often used is to alcoholize the natural oil with the polyhydric alcohol such as glycerol and/or pentaerythritol in proper proportion to give the desired oil length of fatty acid in the resin. The reaction is effected by heating at about 350–450° F. in the presence of a catalyst such as lime or litharge. In this manner, a glycerolized oil or partial ester is obtained. The dicarboxylic acid or anhydride along with other modifying acid such as rosin is then added and the esterification is completed.

Another typical resinous ester used in the invention is the unsaturated higher fatty acid esters of polymeric polyhydric alcohols having alternating aliphatic chains and aromatic nuclei united through ether oxygen. These are the esters of epoxide resins which may be obtained by reacting a polyhydric phenol such as 2,2-bis(4-hydroxyphenyl)propane with epichlorhydrin or glycerol dichlorhydrin and sufficient caustic to combine with the liberated hydrogen chloride. The epoxide resin contains a multiplicity of alternating divalent aromatic groups from the phenol and glyceryl radicals from the chlorhydrin joined together by ether oxygen atoms with predominantly glycidyl radicals in the terminal positions of the chain. By esterification of the epoxide resin with unsaturated fatty acid from drying or semi-drying oil, a resinous ester is obtained which air dries. The product is an olefinically unsaturated fatty acid polyester of an esterfiable glyceryl polyether of a dihydric phenol having alternating glyceryl radicals and the hydrocarbon radicals of the phenol united in a chain by ether oxygen atoms between said radicals, which acid contains 12 to 22 carbon atoms and has an iodine number or value from about 110 to 400, and which polyester contains at least three, preferably at least six, acyloxy groups of the fatty acid joined to glyceryl radicals of the polyether. Resinous esters of this type are disclosed in United States Patents 2,456,408 and 2,596,737, the latter of which also describes styrenated products of such resinous esters which likewise air dry and are suitable for use in the invention. If desired, there may be used mixed resinous esters of drying oil fatty acid and rosin with the dihydric phenolepichlorhydrin condensates as described in United States Patent 2,500,765 as well as mixed resinous ester products from esterification of unsaturated higher fatty acid and polycarboxylic acids or anhydrides with the dihydric phenol-epichlorhydrin condensate as given in United States Patent 2,504,518. Also suitable are the well known styrenated alkyd resins typified in British Patent 573,809. Another group of resinous polyesters used in the invention is the air-drying alkyd resins obtained by reacting mono-allyl ether of glycerol with dicarboxylic acids or anhydrides such as phthalic anhydride or maleic anhydride, which alkyd resins are fully described in United States Patent 2,545,689.

The substance that makes possible the useful homogeneous mixtures of the invention and solubilizes the air-drying resinous ester in the isoparaffinic thinner is a non-ionic surface active agent. A great variety of substances have the required solubilizing or dispersing power for use as the non-ionic surface active agent in the composition. In general, the primary hydrophilic or, more properly, lyophilic part of the surface active agent comprises at least one alcoholic hydroxyl group contained in the compound.

Some dispersing power is also contributed by several other internal chemical groupings which may also be contained in their structure such as carboxylic acid ester groups, ether oxygen atoms, sulfide groups, amide groups and sulfonamide groups. The non-ionic surface active agents are incapable of dissociating and ionizing in water, and they preferably have a solubility of at least 10% by weight in dodecane at 77° F. The hydrophobic part of the compounds is usually a long carbon chain, and the compounds are of low to medium molecular weight, i. e., are non-resinous, in containing about 14 to 50 carbon atoms, usually about 20 to 40 carbon atoms.

The partial esters of polyhydric alcohols and fatty acids of about 12 to 22 carbon atoms that contain one or more free alcoholic hydroxyl groups therein constitute a preferred group of the non-ionic surface active agents used in the composition. These include such representative substances as ethylene glycol monolaurate, monooleate, monopalmitate, and monostearate; diethylene glycol monolaurate, monooleate and monoricinoleate; propylene glycol monolaurate, monomyristate and monoarachidonate; polyethylene glycol monooleate and monostearate; glycerol monocaprate, monolaurate, monooleate, monopalmitate, monostearate, monobehenate, monoricinoleate, monolinoleate, monolinolenate, dilaurate, dioleate, distearate and diricinoleate; pentaerythritol mono-, di- and trioleate as well as like fatty acid partial esters of other polyhydric alcohols such as erythritol, mannitol, sorbitol and polyglycerol.

Glycerol monooleate has been found to be a particularly practical and efficient non-ionic surface active agent for use in the composition of the invention. It is not essential that the glycerol monooleate or other non-ionic surface active agents be pure compounds. Impure commercial products obtained by customary methods of manufacture are satisfactory. Thus glycerol oleate that is a mixture of mono and dioleate obtained by alcoholizing olive oil with glycerol is very suitable. Other partial esters obtained in similar fashion may also be used as is the case with products from glycerolization (alcoholysis with glycerol) of the various fatty oils such as castor oil, dehydrated castor oil, coconut oil, corn oil, cottonseed oil, linseed oil, oiticica oil, olive oil, palm oil, peanut oil, perilla oil, safflower oil, sardine oil, soybean oil, tallow, tung oil, etc. Such surface active agents are known as glycerolized fatty oils.

Other representative non-ionic surface active agents used in the composition include sorbitan monolaurate, sorbitan monooleate, polyoxyethylene sorbitan monolaurate, polyoxyethylene sorbitan monooleate, polyoxyethylene sorbitan monopalmitate, polyoxyethylene sorbitan monostearate, polyoxyethylene sorbitan tristearate, polyoxyethylene propylene glycol, polyglycol ether of dodecylphenol, polyethylene glycol ether of isooctylphenol, oleic acid ethanolamide, oleic acid diethanolamide, lauric acid dipropanolamide, lauric acid ethanolamide and the like, including polyoxyethylenes of such amides.

Certain unexpected advantages and applications of the principle of the invention will now be described below, it being understood, however, that the invention is not to be construed to details here given. The properties and identity of some ingredients will be described first.

THINNER A

An isoparaffinic thinner was prepared in the following manner. Isobutane was alkylated with butylenes containing some propylene and amylenes with use of sulfuric acid as catalyst. The alkylate was stabilized and fractionated to an overhead product with an end point of about 325° F. The bottoms product was then refractionated. The resulting thinner, consisting wholly of isoparaffinic hydrocarbons having about 11 to 13 carbon atoms, will hereinafter be designated as Thinner A for convenience. Below are given the properties of the product which was difficult to distinguish from distilled water with respect to odor:

Table 1

| | |
|---|---|
| Gravity, ° API | 53.9 |
| Aniline cloud point, ° F | 186 |
| Kauri butanol number | 26 |
| Flash point, TCC, ° F | 138 |
| ASTM distillation, ° F.: | |
| IBP | 357 |
| 10% | 361 |
| 50% | 367 |
| 90% | 382 |
| EP | 405 |

ALKYD RESIN A

This air-drying alkyd resin (which will be designated hereinafter as above) manufactured by Devoe and Raynolds Company, Inc. was a medium oil length soybean phthalic alkyd modified with a minor amount of tall oil and pentaerythritol. It contained about 32% phthalic anhydride and was used as a 40% solids solution in isoparaffinic hydrocarbons like Thinner A. The properties of the product were as follows:

Table 2

| | |
|---|---|
| Solids | 40% |
| Viscosity, Gardner-Holdt | Z-5 |
| Weight per gallon | 7.15 |
| Acid No. (solids basis) | 19 |

ALKYD RESIN B

This was an air-drying short oil length alkyd resin manufactured by Sherwin-Williams Company from soy bean oil, phthalic anhydride, glycerol and pentaerythritol containing about 37% phthalic anhydride and having an acid number of about 15. It was used as a solution having 90% solids in Thinner A.

POLYESTER RESIN C

This was a soybean acid ester of the esterifiable condensate of epichlorhydrin and 2,2-bis(4-hydroxyphenyl)-propane. The epoxy resin had been made by reacting one mole of the polyhydric phenol with 1.22 moles of epichlorhydrin and 1.37 moles of sodium hydroxide to give a resin having a Durrans' Mercury Method softening point of 102° C., a molecular weight measured ebullioscopically in ethylene dichloride of about 1400 and an equivalent weight to esterification of 175. The polyester was prepared by esterifying 435 parts by weight of the epoxide resin with 565 parts of soybean oil fatty acid to an acid number of 5.

The efficiencies of the non-ionic surface active agents listed in Table 3 below were tested at 1% by weight concentration in Thinner A for Alkyd Resins A and B. These were titration tests wherein the thinner was added to the resin with stirring until the resin was precipitated and kicked out of solution. The concentration in percent by weight of the resin at which precipitation occurred was noted and is tabulated. The lower the percentage, the greater the solvency power of the thinner gained by having the non-ionic surface active agent present.

Table 3

| Surface Active Agent Present at 1% by Weight Concentration in Thinner A | Weight Percent Resin at Which Precipitation Occurs With Alkyd Resin | |
|---|---|---|
| | A | B |
| None | 19.0 | 35.0 |
| Glycerol monooleate [1] | 10.0 | 23.0 |
| Pentaerythritol monooleate | 12.4 | |
| Sorbitan monooleate | 10.0 | 23.0 |
| Sorbitan monolaurate | 15.0 | |
| Ethylene glycol monooleate | 14.5 | |
| Diethylene glycol monooleate | 15.3 | 26.0 |

[1] From Kessler Chemical Company.

As will be seen below, the various listed ionic surface active agents do not effect solubilization of the air-drying resinous esters in isoparaffinic hydrocarbons. In fact, most are insoluble therein. Table 4 below gives the results of tests with various anionic and cationic surface active agents used with Thinner A and Alkyd Resin A. In the case where the surface active agent was dispersed in the thinner, it was present at 6% concentration by weight in relation to the resin.

Table 4

| Surface Active Agent | Solubility in Thinner A | Weight Percent Resin at Which Precipitation Occurs |
| --- | --- | --- |
| None | | 19.0 |
| Sodium oleate | Insoluble | |
| Ammonium stearate | do | |
| Lithium stearate | do | |
| Sodium lauryl sulfonate | do | |
| Ammonium ricinoleate | Slightly dispersed | 18.5 |
| Daxad 11 [1] | Insoluble | |
| Daxad 23 [1] | do | |
| Daxad 27 [1] | do | |
| Lauryl pyridinium bromide | do | |

[1] Sodium salt of formaldehyde condensate of alkylnaphthalene sulfonic acid manufactured by Dewey and Almy Company.

The effect of different concentrations of non-ionic surface active agents will be evident from the test data given in Table 5. The tests were also performed by the titration method with use of Thinner A and the noted alkyd resins.

Table 5

| Surface Active Agent Present in Noted Percent by Weight Concentration in Thinner A | Weight Percent Resin at Which Precipitation Occurs With Alkyd Resin | |
| --- | --- | --- |
| | A | B |
| None | 19 | 35 |
| 1% Glycerol monooleate [1] | 12 | 30 |
| 2% Glycerol monooleate [1] | CM [2] | 19 |
| 3% Glycerol monooleate [1] | CM | CM |
| 1% Pentaerythritol monooleate | 12 | 30 |
| 2% Pentaerythritol monooleate | CM | 19 |
| 3% Pentaerythritol monooleate | CM | CM |
| 1% Sorbitan monooleate | 10 | 23 |
| 2% Sorbitan monooleate | CM | 17 |
| 3% Sorbitan monooleate | CM | CM |

[1] Technical grade from Emulsol Corporation.
[2] CM means completely miscible.

Not only does the presence of the non-ionic surface active agent enable the air-drying resinous esters to be solubilized in isoparaffinic thinner, but also the viscosity of the resin solution is reduced by the presence of the surface active agent as shown from the data in Table 6. This reduction in viscosity is most important for preparation of surface coating compositions having proper fluidity for brushability and flow.

Table 6

| | Composition in Percent by Weight | | Viscosity in Gardner-Holdt Units |
| --- | --- | --- | --- |
| 1 | Alkyd Resin A | 25 | Q (4.35 stokes). |
| | Thinner A | 75 | |
| 2 | Alkyd Resin A | 22.8 | A-2 (0.22 stokes). |
| | Glycerol monooleate | 2.2 | |
| | Thinner A | 75 | |
| 3 | Alkyd Resin B | 40 | >Z-6 (>148 stokes). |
| | Thinner A | 60 | |
| 4 | Alkyd Resin B | 38.2 | Z-5 (98.5 stokes). |
| | Glycerol monooleate | 1.8 | |
| | Thinner A | 60 | |

Another example of the fluidizing and viscosity reduction gained with use of the non-ionic surface active agent when isoparaffinic thinner is employed will be given. The air-drying alkyd resin used was a short oil soybean alkyd modified with pentaerythritol containing 38% phthalic anhydride. The resin had been produced by the solvent method and dropped hot from the resin kettle without quenching in thinner. It was a brittle amber material which contained about 5% xylene used as azeotroping solvent during preparation. Upon melting this resin in a closed kettle while stirring and sparging with nitrogen, and adding sufficient Thinner A to give a mixture containing 30% solids, the resin did not dissolve in the thinner although the temperature was increased to about 110° C. Instead, only a cloudy heterogeneous mixture was obtained which at room temperature had the consistency of very stiff putty. However, upon repeating the test with addition of Thinner A containing glycerol monooleate, a quite different result was obtained. The alkyd resin was likewise heated with stirring and sparging with nitrogen to about 90° C., whereupon a 3% solution of glycerol monooleate in Thinner A was added during the course of about 20 minutes while the temperature was at about 65 to 110° C. A clear solution of resin in the hot thinner was obtained containing about 30% solids, and then additional glycerol monooleate was added to bring its concentration in the thinner up to about 7%. Upon cooling to room temperature, the solution had only a slightly hazy appearance and was a mobile fluid.

The effectiveness of the unexpected principle of the invention was also tested with Polyester Resin C and Thinner A by use of the titration method. The results are given in Table 7.

Table 7

| Surface Active Agent Present in Noted Percent by Weight Concentration in Thinner A | Weight percent Resin at Which Precipitation Occurs With Polyester Resin C |
| --- | --- |
| None | 33 |
| 1% Glycerol monooleate | 23 |
| 2% Glycerol monooleate | 18 |
| 3% Glycerol monooleate | 14 |
| 5% Glycerol monooleate | 8 |
| 7% Glycerol monooleate | 6 |
| 3% Sorbitan monooleate | 14 |

In broad aspect, the invention is the odorless surface coating composition comprising an air-drying resinous ester dissolved and dispersed in a hydrocarbon thinner consisting essentially of at least 92% by weight of isoparaffinic hydrocarbons boiling within the range of about 300° F. to about 470° F. and also containing a solubilizing amount of non-ionic surface active agent for the resinous ester. Based upon the amount of thinner used, the concentration of surface active agent is in the range of from about 0.3% to 8% by weight, usually from about 1 to 7% and preferably from about 2 to 5%. This composition constitutes the essential and distinguishing part of the invention although the composition as normally used also contains certain other ingredients such as pigments and customary driers in order to enable obtainment of a dried protective film that has hiding power and color.

All of the usual pigments are applicable for use in the composition including colored and white pigments. The pigments may be one or more of such materials as white lead (basic carbonate), white lead (basic sulfate), zinc oxide, leaded zinc oxide, lithopone, zinc sulfide, titanium oxide (rutile), titanium-barium pigment, titanium-calcium pigment, titanium-magnesium pigment, lead titanate, basic lead silicate, iron oxide, lamp black, lead chromate, ultramarine blue, and the like. In formulating the surface coating composition with pigments, the pigment to binder (resinous ester vehicle) ratio may vary widely such as from about 1/0.3 to 1/4.0, particularly good flats and semi-gloss being obtained with a pigment to binder ratio of about 1/0.4 to 1/2.0.

Usually the percentage of resinous ester or vehicle in admixture with the thinner is from about 10 to 35% by weight, i. e., one hundred parts of the mixture of vehicle and thinner contains about 10 to 35 parts by weight of vehicle and 65 to 90 parts of thinner. The particular proportion used, of course, will depend upon the spreadability and flow characteristics desired with the composition. In some cases, the proportion will be outside of the indicated proportion due to the nature of the resinous ester, the pigment loading, etc.

In order that the coating composition will be odorless, which is an object of the invention, it is necessary that the thinner be composed predominantly of isoparaffinic hydrocarbons. Preferably, the whole of the thinner is isoparaffinic hydrocarbons. However, a large number of air-drying resinous esters such as alkyd resins are prepared by the solvent method rather than the fusion method with the result that the resins contain perhaps about 3 to 10% of residual hydrocarbon solvent therein which is usually xylene, this aromatic hydrocarbon being a favorite material for azeotroping water from the reaction mixture during preparation of the resin. Now, it is not the intent of this application to exclude from the scope of the appended claims use of such solvent-containing resins. In fact, no difficulty with odor is encountered provided the hydrocarbon thinner contains at least about 92% by weight of isoparaffinic hydrocarbons. The remaining hydrocarbon may be such an odoriferous material as xylene and yet the composition as a whole is free from perceptible bulk odor during application as a film. Preferably, of course, the entire hydrocarbon thinner is isoparaffinic.

The coating composition is prepared by mixing together the several ingredients in any desired order. If desired, the surface active agent may be first mixed with the thinner and then the resin admixed therewith. The surface active agent may also be mixed first with the resin and then the thinner added. Since it is convenient to quench the hot fresh resin with a limited amount of the thinner, this thinner may contain the surface active agent in sufficient amount desired for the finished coating composition afterwards prepared by further dilution with the thinner. When pigments are used, a mixture of all or part of the resinous ester with the surface active agent and only part of the thinner is mixed and ground with the pigments, usually on a paint, pebble or roll mill. Then any remainder of the resinous ester and additional thinner is added along with the usual amount of drier such as lead, cobalt and/or manganese naphthenate or resinate.

Some representative complete pigmented surface coating compositions of the invention are exemplified below wherein the parts are by weight.

A flat white is prepared with use of Thinner A and Alkyd Resin B by first grinding together the following substances for about 16 hours in a pebble mill.

| | Parts by weight |
|---|---|
| Alkyd Resin A (100% solids basis) | 56 |
| TiO₂—rutile | 175 |
| TiO₂—calcium base | 350 |
| Whiting | 75 |
| Zinc palmitate | 3 |
| Basic lead stearate | 3 |
| Thinner A | 200 |
| Glycerol monooleate | 12 |

To the grind, there is then added 50 parts of mica and grinding is continued for an additional hour after which there is added an additional 65 parts of Alkyd Resin B (100% solids basis), 215 parts of Thinner A and 6.6 parts of lead-cobalt drier. The composition has a pigment to binder ratio of about 1/0.67, has about a 2.9% concentration of the non-ionic surface active agent in the isoparaffinic thinner, and contains about 22.6% of resinous ester in the mixture of resin and thinner. The flat is odorless and dries hard as a film in about 10 hours.

Another flat tone white formulation is prepared from Thinner A and Alkyd Resin A by first mixing as a paste and then running through three times on a roll mill the following:

| | Parts by weight |
|---|---|
| Alkyd Resin A | 1412 |
| TiO₂—rutile | 1882 |
| Whiting (CaCO₃) | 3137 |
| China clay | 753 |
| Silica pigment | 439 |
| Aluminum stearate | 34 |
| Thinner A | 2250 |
| Sorbitan monooleate | 70 |

To the mixture is then added with stirring, 1250 parts of additional Thinner A and 34 parts of drier. The composition contains about 2% of non-ionic surface active agent in the isoparaffinic thinner, has a pigment to binder ratio of about 1/0.62, and contains about 29% of alkyd resin in the mixture of resin and thinner. This flat tone is odorless and dries hard as a film in about 12 hours.

I claim as my invention:

1. An odorless surface coating composition comprising a mixture of an air-drying resinous ester containing esterified unsaturated fatty acid of 12 to 22 carbon atoms and having an iodine number of at least 110 dissolved and dispersed in a hydrocarbon thinner consisting essentially of at least 92% by weight of isoparaffinic hydrocarbons boiling within the range of about 300° F. to about 470° F., the concentration of said resinous ester in said mixture of resinous ester and isoparaffinic hydrocarbon thinner being from about 10 to 35% by weight, said composition also containing, to increase the miscibility of the resinous ester in the isoparaffinic hydrocarbon thinner, a solubilizing amount of non-ionic surface active agent for the resinous ester in the range of about 0.3 to 8% by weight of the thinner, said surface active agent containing 14 to 50 carbon atoms and possessing at least one alcoholic hydroxyl group in the molecule.

2. An odorless surface coating composition comprising a mixture of an air-drying short to medium oil length alkyd resin containing esterified unsaturated fatty acid of 12 to 22 carbon atoms and having an iodine number of at least 110 carried uniformly in a hydrocarbon thinner consisting essentially of at least 92% by weight of isoparaffinic hydrocarbons boiling within the range of about 300° F. to 470° F., the concentration of said alkyd resin in said mixture of alkyd resin and isoparaffinic hydrocarbon thinner being from about 10 to 35% by weight, said composition also containing, to increase the miscibility of the alkyd resin in the isoparaffinic hydrocarbon thinner, a solubilizing amount of non-ionic surface active agent for the alkyd resin in the range of about 0.3 to 8% by weight of the thinner, said surface active agent containing 14 to 50 carbon atoms and possessing at least one alcoholic hydroxyl group in the molecule.

3. An odorless surface coating composition comprising a mixture of an air-drying resinous ester containing esterified unsaturated fatty acid of 12 to 22 carbon atoms and having an iodine number of at least 110 solubilized in a hydrocarbon thinner consisting essentially of at least 92% by weight of isoparaffinic hydrocarbons boiling within the range of about 325° F. to 425° F., the concentration of said resinous ester in said mixture of resinous ester and isoparaffinic hydrocarbon thinner being from about 10 to 35% by weight, said composition also containing, to increase the miscibility of the resinous ester in the isoparaffinic hydrocarbon thinner, a solubilizing amount of non-ionic surface active agent for the resinous ester in the range of about 0.3 to 8% by weight of the thinner, said surface active agent containing 14 to 50 carbon atoms and possessing at least one alcoholic hydroxyl group in the molecule.

4. A composition as defined by claim 3 wherein the resinous ester is a short to medium oil length alkyd resin, and the surface active agent is glycerol monooleate.

5. A composition as defined by claim 3 wherein the resinous ester is a short to medium oil length alkyd resin, and the surface active agent is pentaerythritol monooleate.

6. A composition as defined by claim 3 wherein the resinous ester is a short to medium oil length alkyd resin, and the surface active agent is sorbitan monooleate.

7. An odorless surface coating composition comprising a mixture of (1) an olefinically unsaturated fatty acid ester of an esterifiable glyceryl polyether of a dihydric phenol having alternating glyceryl radicals and the hydrocarbon radicals of the phenol united in a chain by ether oxygen atoms between said radicals, which fatty acid contains 12 to 22 carbon atoms and has an iodine number of 110 to 400, dissolved in (2) a hydrocarbon thinner consisting essentially of at least 92% by weight of isoparaffinic hydrocarbons boiling within the range of about 300° F. to 470° F., the concentration of said fatty acid ester in said mixture of fatty acid ester and isoparaffinic hydrocarbon thinner being from about 10 to 35% by weight, said composition also containing, to increase the miscibility of the fatty acid ester in the isoparaffinic hydrocarbon thinner, a solubilizing amount of non-ionic surface active agent for the fatty acid ester in the range of about 0.3 to 8% by weight of the thiner, said surface active agent containing 14 to 50 carbon atoms and possessing at least one alcoholic hydroxyl group in the molecule.

8. A composition as defined by claim 7 wherein the dihydric phenol is 2,2-bis(4-hydroxyphenyl)propane, and the surface active agent is glycerol monooleate.

9. An odorless surface coating composition comprising a pigment and a mixture of an air-drying short to medium oil length alkyd resin containing esterified unsaturated fatty acid of 12 to 22 carbon atoms and having an iodine number of at least 110 carried uniformly in a hydrocarbon thinner consisting essentially of at least 92% by weight of isoparaffinic hydrocarbons boiling within the range of about 325° F. to about 425° F., the concentration of said alkyd resin in said mixture of alkyd resin and isoparaffinic hydrocarbon thinner being from about 10 to 35% by weight, said composition also containing, to increase the miscibility of the alkyd resin in the isoparaffinic hydrocarbon thinner, a solubilizing amount in the range of about 1 to 7% by weight, based upon the thinner, of non-ionic surface active agent, in which composition the pigment to binder ratio is from about 1/0.3 to 1/4.0 and the isoparaffinic hydrocarbons contain at least 2 carbon atoms that have no more than one hydrogen atom linked directly thereto, said surface active agent containing 14 to 50 carbon atoms and possessing at least one alcoholic hydroxyl group in the molecule.

10. A composition as defined by claim 9 wherein the non-ionic surface active agent is a mixture of glycerol monooleate and dioleate.

11. A composition as defined by claim 9 wherein the surface active agent is pentaerythritol monooleate.

12. A composition as defined by claim 9 wherein the surface active agent is sorbitan monoleate.

References Cited in the file of this patent

UNITED STATES PATENTS

| | | |
|---|---|---|
| 2,321,303 | McArdle | June 8, 1943 |
| 2,561,816 | Pabst et al. | July 24, 1951 |
| 2,628,206 | Deniston | Feb. 10, 1953 |